United States Patent [19]

Moscovitch

[11] Patent Number: 4,603,903
[45] Date of Patent: Aug. 5, 1986

[54] ADJUSTABLE CAR SEAT

[75] Inventor: Jerry N. Moscovitch, Toronto, Canada

[73] Assignee: BoPeep Nursery Products Limited, Toronto, Canada

[21] Appl. No.: 642,843

[22] Filed: Aug. 21, 1984

[30] Foreign Application Priority Data

Jun. 14, 1984 [CA] Canada .................................. 456573

[51] Int. Cl.⁴ ............................................. A47D 1/10
[52] U.S. Cl. .................................... 297/250; 297/338; 297/440
[58] Field of Search ............... 297/250, 338, 440, 411, 297/107, 443, 422

[56] References Cited

U.S. PATENT DOCUMENTS

| | | | |
|---|---|---|---|
| 2,466,350 | 4/1949 | Anderson | 297/338 |
| 2,570,687 | 10/1951 | Kahn | 297/338 |
| 2,793,679 | 5/1957 | Layne | 297/250 X |
| 4,109,961 | 8/1978 | Opsvik | 297/338 |
| 4,275,923 | 6/1981 | Molnar | 297/250 |

FOREIGN PATENT DOCUMENTS 2006617  5/1979  United Kingdom ................ 297/338

Primary Examiner—Francis K. Zugel
Attorney, Agent, or Firm—Arne I. Fors; Robert F. Delbridge

[57] ABSTRACT

An adjustable safety seat for children for use in a motor vehicle. Height and width configuration of the seat can be easily changed to suit children of different sizes or a growing child.

The child's safety seat comprises a pair of side pedestals and a seat bench. Raising of the bench relative to the pedestals for a small child concurrently narrows the width of the seat and lowering of the bench for a larger child concurrently widens the seat.

The safety seat and a child contained therein are securely and safely positioned on a vehicle seat by means of the vehicle seat belts.

23 Claims, 13 Drawing Figures

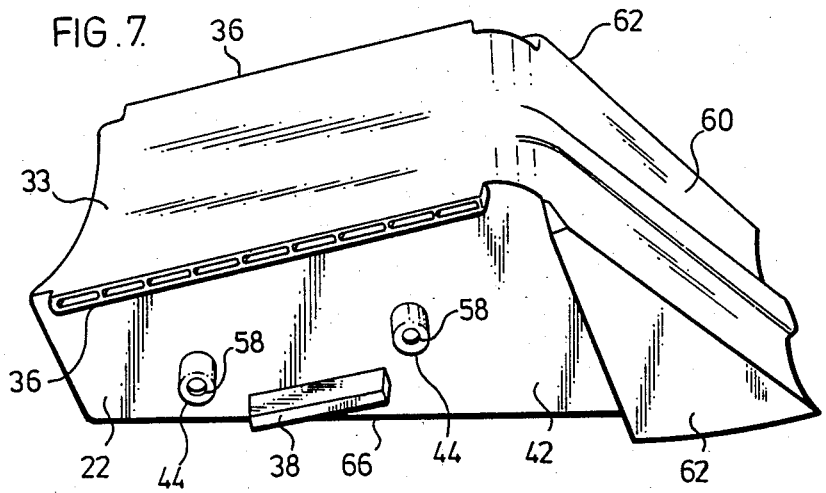
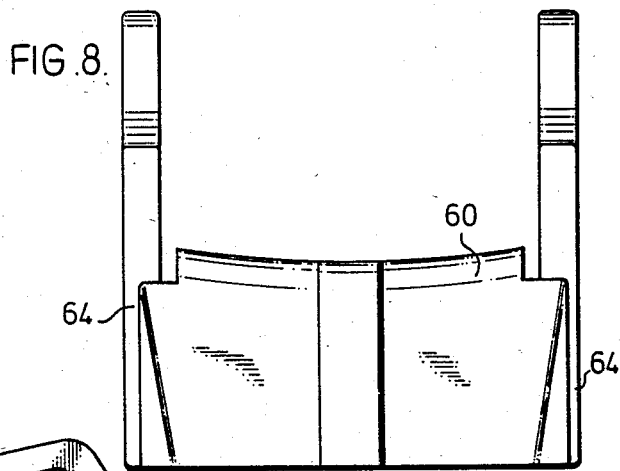
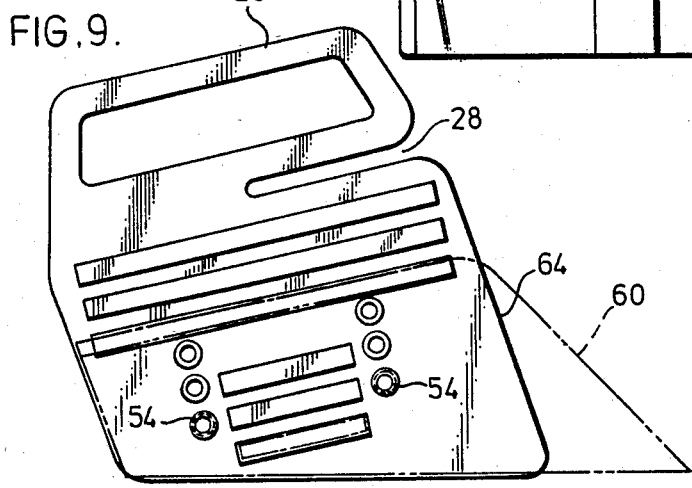

ADJUSTABLE CAR SEAT

FIELD OF THE INVENTION

This invention relates to an adjustable seat for children and, more particularly, relates to an adjustable seat for children for use in a motor vehicle.

BACKGROUND OF THE INVENTION

Child restraint systems incorporating safety seats with vehicle seat belts are known. However, the height and width of such seats usually cannot be easily changed to accommodate children of various sizes or to accommodate the increase in size of a single child as it grows.

Any seating means intended to be used in a vehicle must safely and comfortably secure the child within the seat. Existing seating means for use in motor vehicles may not be adequately adjustable to accomplish these ends for children of different sizes or for a single growing child while providing desired safety features.

It is therefore an object of the present invention to provide an adjustable seat suitable for use in a vehicle which will safely and comfortably secure a child within the seat. It is also desirable that such a seat may be readily adjustable over a wide range of the children's sizes in order to accommodate different children of different sizes or a single child as it grows.

With a view to overcoming these problems and providing the above advantages, the present invention provides a seat for children which is simultaneously adjustable both in height and in width and which is suitable for use in a vehicle. As a child grows, the seat may be made wider as it is lowered whereby the child may be safely and comfortable secured in the seat by means of a vehicle seat belt through a range of sizes.

SUMMARY OF THE INVENTION

The present invention comprises an adjustable child's seat, for use in association with a base to which the seat may be placed or attached, such as a table or the seating means of a vehicle, wherein said child's seat comprises a bench, side pedestals on each of two opposite sides of the bench, releasable support means for supporting the bench on each pedestal at any one of a plurality of vertically spaced apart locations, spacer means for laterally spacing the pedestals at any one of plurality of predetermined distances apart, and fastening means for attaching said pedestals to the bench.

The releasable support means and spacer means are adapted to narrow the lateral spacing of the pedestals at upper positions of the bench and to widen the lateral spacing of the pedestals at lower positions of the bench.

The releasable support means and spacer means are provided by a plurality of vertically spaced first recess means formed in the side pedestals, the recesses being adapted to receive an edge or projection extending from a side of the bench to provide support means and the depths of the recesses decreasing from a maximum depth at the uppermost first recess means to a minimum depth at the lowermost first recess to provide said spacer means.

Second support means and spacer means below the releasable support means and spacer means are provided by a plurality of vertically spaced second recess means formed in the side pedestals, said second recess means being adapted to receive an edge or projection extending from a side of the bench and having depths decreasing from a maximum depth at an uppermost second recess means to a minimum depth at a lowermost second recess means, in increments substantially equal to depth increments between corresponding first recess means, said second recess means being equally vertically spaced from first recess means of a corresponding depth.

The fastening means preferably comprise at least one and preferably two studs projecting from each side of the bench and a plurality of generally vertically spaced-apart mating sockets formed in the pedestals, the socket(s) having a verticle spacing corresponding to the vertical spacing of the first recess means and having depths decreasing from a maximum depth at an uppermost socket to a minimum depth at a lowermost socket substantially equal to the depths of corresponding first recesses.

The side pedestals have rearwardly extending slots formed in front edges thereof to receive a vehicle seat belt. The bottom edge of each pedestal preferably is inclined rearwardly upward at an angle of from about 7° to 15°, preferably about 13°, relative to the plane of the bench seat whereby the bench when the seat is positioned on a vehicle seat is rearwardly downwardly inclined at least 10° to the horizontal.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 7 is a perspective view of the seat bench;

FIG. 8 is a front elevation of the seat of the invention in its lowermost and widest position;

FIG. 9 is a side elevation of the said seat in a position corresponding to FIG. 8;

DESCRIPTION OF A PREFERRED EMBODIMENT OF THE INVENTION

Figure 1:
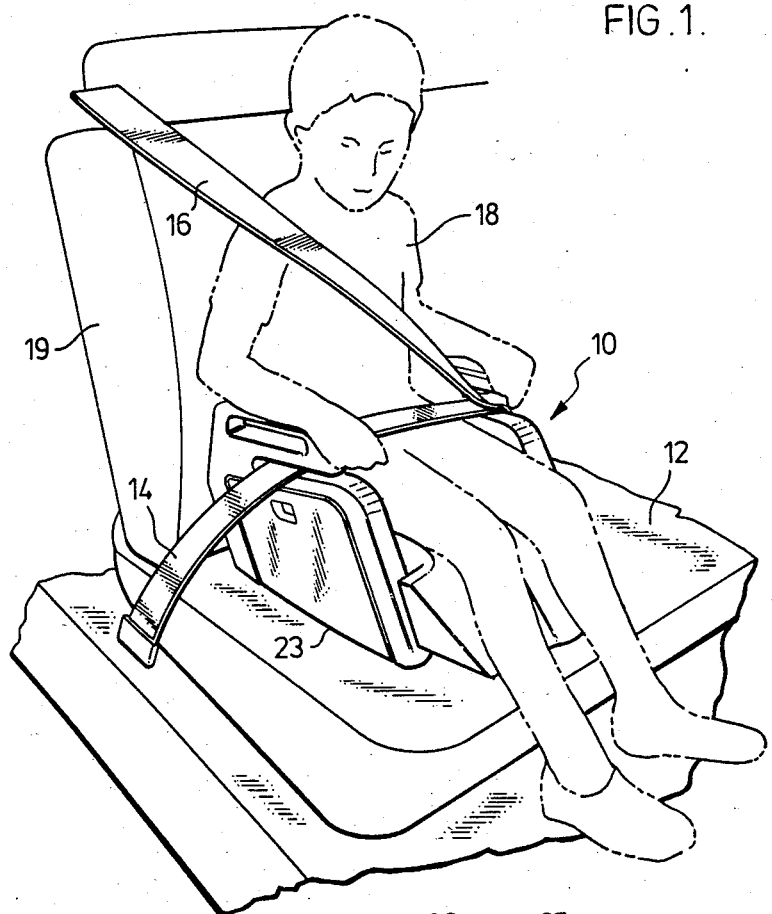
FIG. 1 is a perspective view the front and side of a child's seat according to the invention as it may be installed in a vehicle in its operative position.
Figure 3:
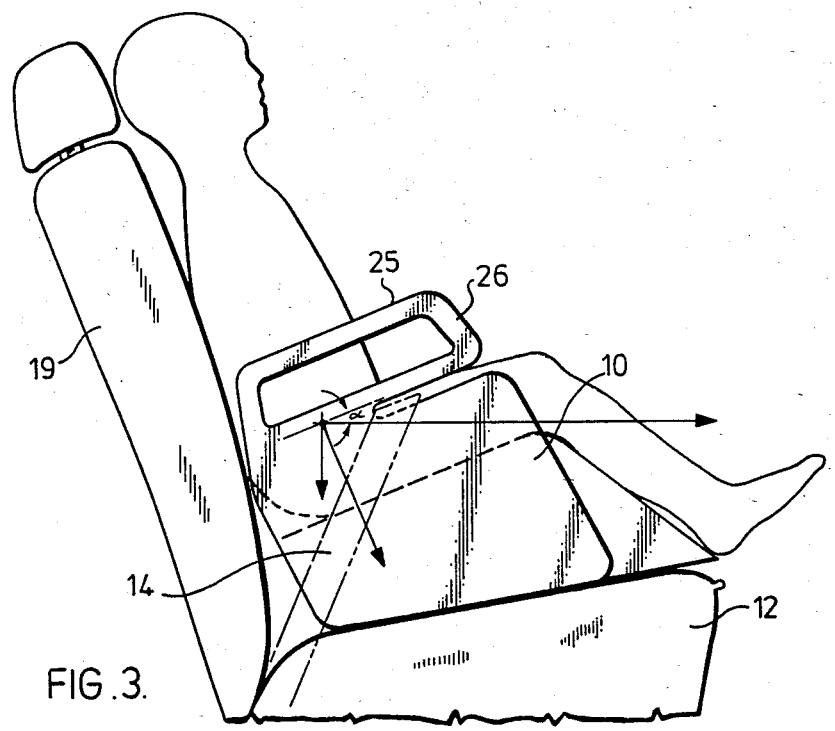
FIG. 3 is a side elevation of the child's seat in the embodiment of FIG. 1 containing a child.

With reference to FIGS. 1 and 3, there is illustrated a child's seat 10 shown attached to seat 12, which may be the seat of a motor vehicle, by seat belt 14. Seat belt 14 maintains child's seat 10 securely in place within the vehicle (not shown). Seat belt 14 may also cooperate with shoulder belt 16 to secure child 18 in place within child's seat 10. In the event of an accident involving the vehicle, the child 18 will be secured within seat 10 and seat 10 will be securely held to vehicle seat 12 and seat back 19.

Figure 2:
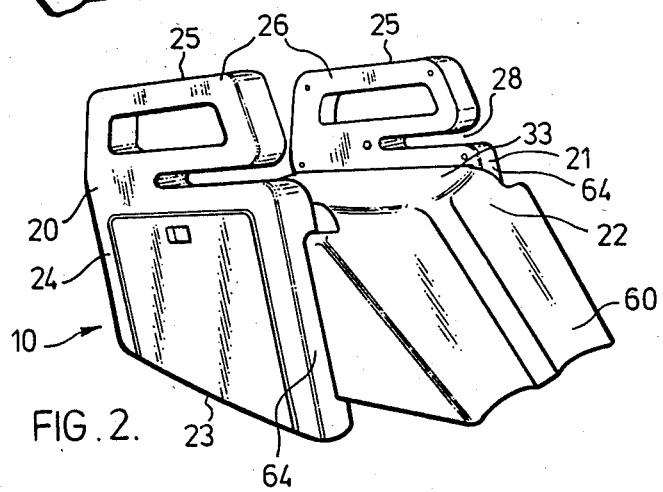
FIG. 2 is a perspective view of said seat in its uppermost narrow position of said seat.
Figure 4:
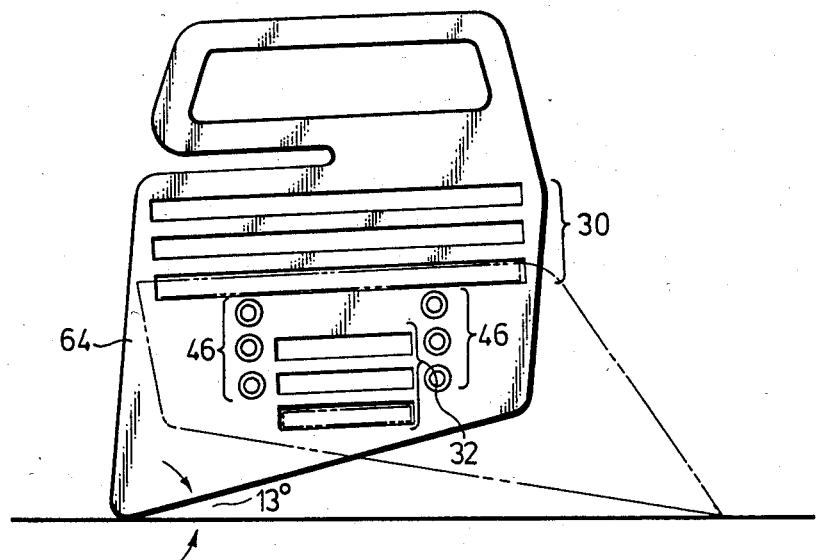
FIG. 4 is a side elevation of a seat pedestal of the invention with the seat bench in a reversed position.

Child's seat 10, shown more clearly in FIG. 2, comprises two side pedestals 20, 21 which support bench 22. Side pedestals 20, 21 and bench 22 preferably are hollow wall structures formed of a structurally strong thermoplastic or thermosetting plastic such as molded acrylonitrile butadiene styrene (ABS) or polypropylene. The pedestals 20, 21 are esentially identical to each other, except that one pedestal is a mirror image of the other, the pedestals having a generally trapedoizal shape with bottom edges 23 rearwardly upwardly inclined at angle of about 7°–15° to the plane of the bench such that top edges 25 of the pedestals are rearwardly inclined at least about 10° to the horizontal as depicted by angle $\alpha$ in FIG. 3 when the child's seat is placed on a vehicle seat.

Figure 5:
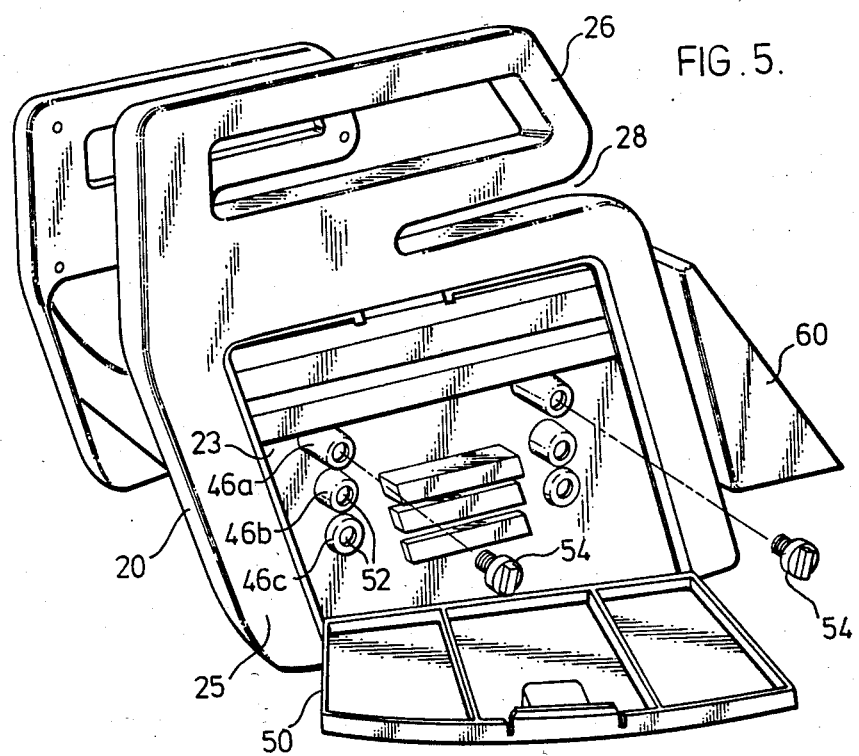
FIG. 5 is a perspective view of the side and rear of the said seat.
Figure 6:
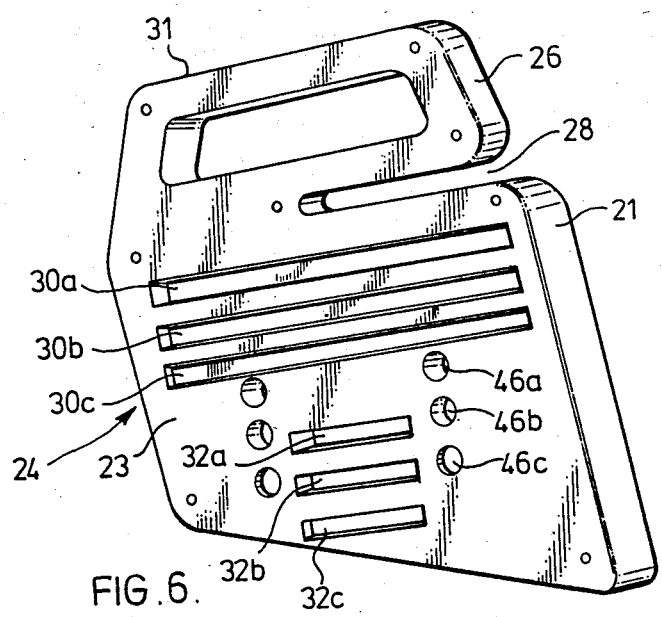
FIG. 6 is a perspective view of the inner side of a seat pedestal.

Referring to FIGS. 5 and 6, each pedestal 20, 21 defines an internal side 23 and an external side 25. Each pedestal 20, 21 has a base portion 24 with an upper arm rest 26. A rearwardly inclined elongated belt receiving slot 28 is defined between arm rest 26 and base portion 24 at the front edge 29 of each pedestal to accommodate belt 14 in the manner illustrated in FIG. 1 to maintain the belt on the child's thighs below the abdomen.

With reference to FIG. 6, a plurality of parallel vertically spaced bench-receiving recesses 30 are formed in the inner side 23 of each pedestal. Recesses 30 are oriented parallel to the upper surface 31 of arm rest 26 such that the upper surface 33 of bench 22 is disposed substantially parallel to the said upper surface 31 of the arm rest when the chair is assembled.

Three bench-receiving recesses are shown in the embodiment illustrated, although it will be understood that the number of recesses may vary. The depth of recesses 30 decreases progressively from the uppermost deep recess 30a to the lowermost shallow recess 30b, the recesses 30a, 30b and 30c being conveniently arranged one below the other and spaced apart a minimum distance from each other in order to achieve maximum adjustability. Such minimum distance will depend on the load bearing characteristics of the material used to construct each of the side pedestals 20, 21.

Figure 10:
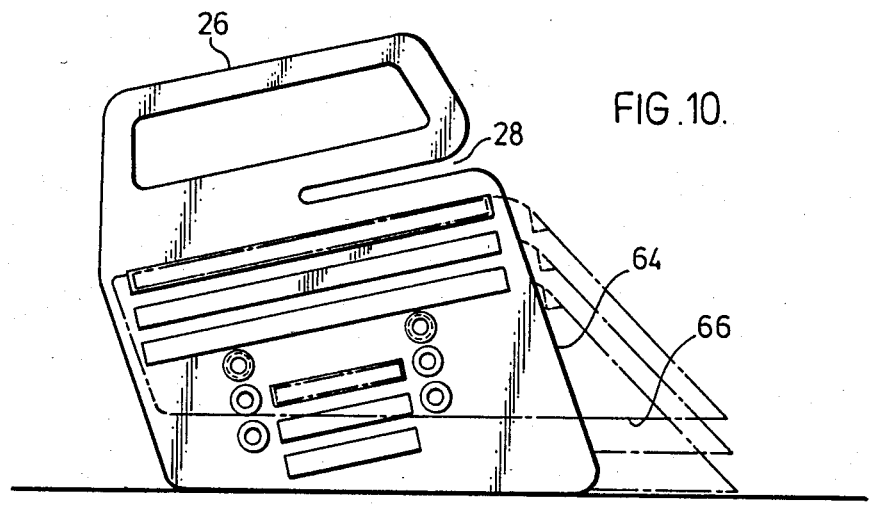
FIG. 10 is a side elevation of the seat illustrating the seat bench in its uppermost position by solid lines and in its lowermost and intermediate positions by ghost lines.
Figure 11:
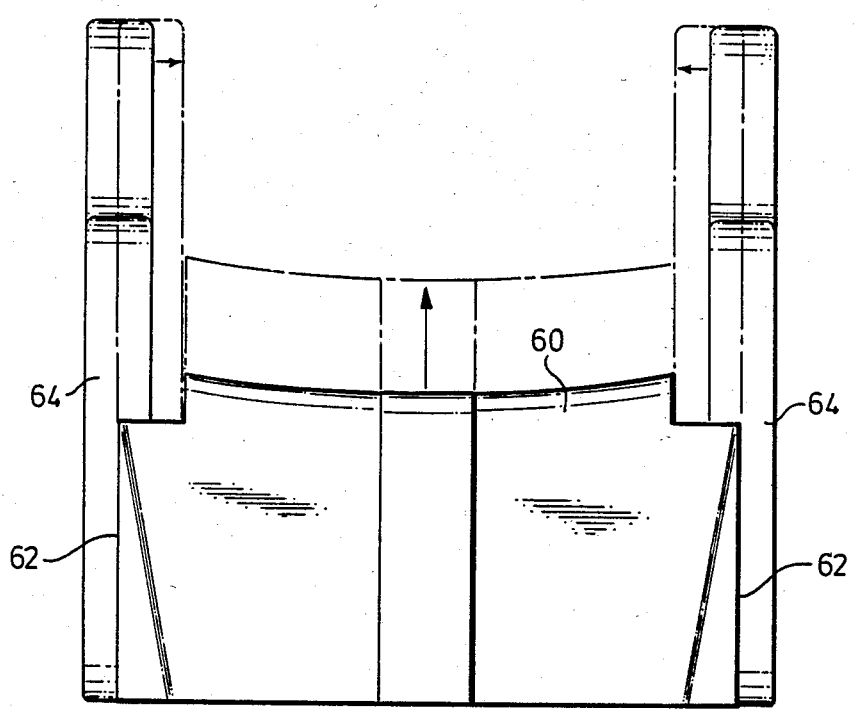
FIG. 11 is a front elevation of the seat illustrating the seat bench in its lowermost and widest position by solid lines and in its uppermost and narrow position by ghost lines.

Base portion 24 further defines a plurality of parallel support receiving recesses 32, the depth of support receiving recesses 32 decreasing in increments corresponding to the depth increments between bench receiving recesses 30 from the uppermost recess 32a to the lowermost recess 32c. Recesses 32a, 32b and 32c are conveniently disposed a spaced distance below recesses 30, thus defining an area between groups of recesses 30 and 32, recesses 32a, 32b and 32c being arranged one below the other parallel to recesses 30a, 30b and 30c. Each pair of first recesses 30 and corresponding second recesses 32 of the same depth are spaced an equal distance apart whereby the upper edge or support flange 36 extending from each side of bench 22 can be inserted in a first recess 30 of pedestals 20, 21 and the lower projection 38 inserted in a lower recess 32 of the same depth. Flange 36 may be inserted into any bench receiving recess 30 and, as flange 36 is moved from one bench receiving recess 30 to a lower bench receiving recess 30, side pedestals 40 are held further apart as the recesses decrease in depth. FIGS. 8 and 9 show the seat assembled in its lowermost wide position and FIGS. 10 and 11 illustrate the effect of raising the bench relative to the side pedestals in narrowing the lateral spacing between the pedestals.

Bench 22 is shown most clearly with reference to FIG. 7 and comprises side walls 42 inter-connected at their upper edges by a seat portion 33 which has an essentially rectangular shape in plan and is contoured whereby a child may seat comfortably. Laterally projecting upper flanges 36 and lower projections 38 extend outwardly from side walls 42 an equal distance for insertion into corresponding pairs of recesses 30, 32 of the side pedestals.

At least one and preferably two studs 44 are formed in side walls 42 for insertion into sockets 46 formed in the inner side 23 of pedestals 20, 21. Studs 44 project the same distance from side wall 42 as phlange 36 and projection 38. With reference to FIGS. 5 and 6 and FIGS. 11 and 12, mating sockets 46 have depths which decrease from a maximum depth at the uppermost socket 46a to a minimum depth at the lowermost socket 46c corresponding to the depths of the related pair of first and second recesses.

Figures 12, 13:
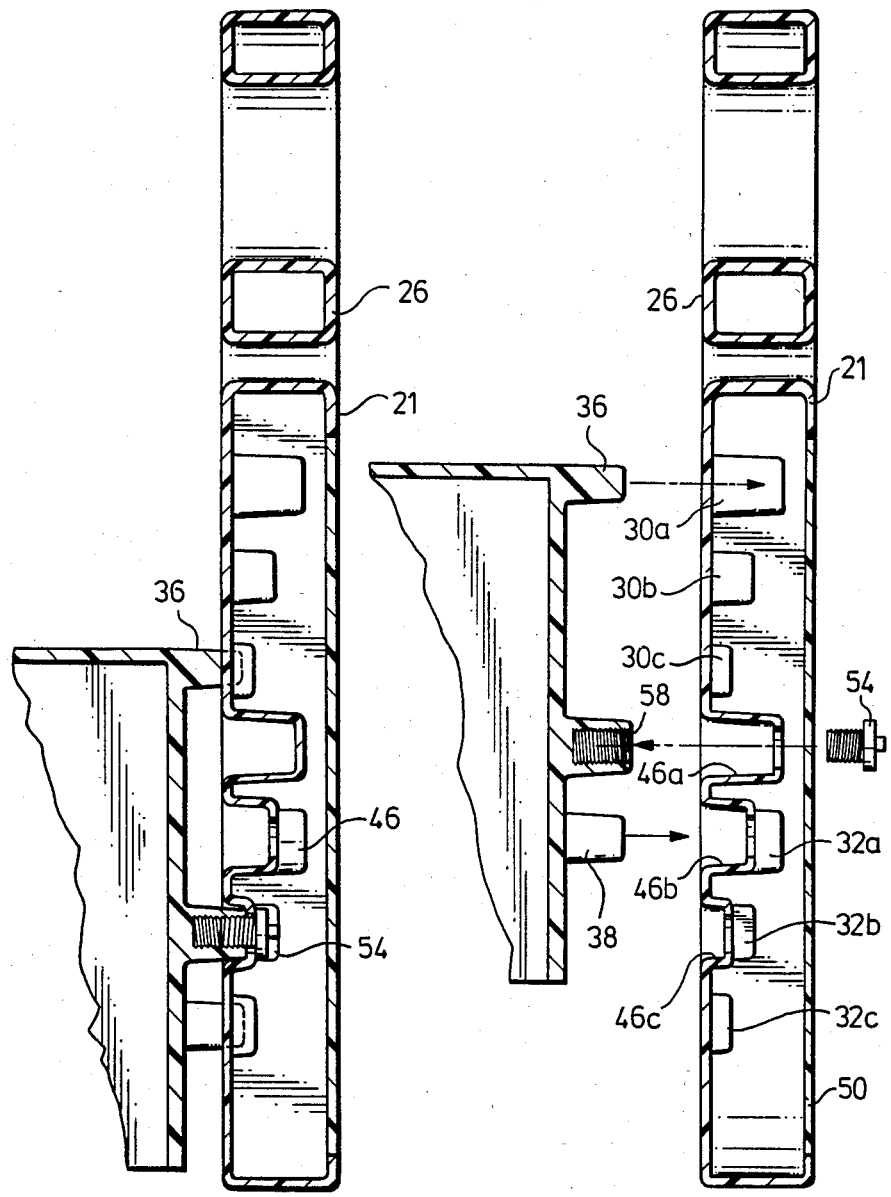
FIG. 12 is a vertical section, partially broken away, through a pedestal and the bench of the seat assembled, in its lowermost position.
FIG. 13 a vertical section corresponding to FIG. 11, partially broken away, of the bench preparatory to assembly in its uppermost position in a pedestal.

The exterior surface 25 of each of pedestals 20, 21 has a panel 50, shown in FIG. 5 opened to expose the interior surface of wall 23. Sockets 46 have central openings 52 to permit a bolt 54, preferably formed of plastic, to extend therethrough for engagement with the threaded opening 58 of each of studs 44 whereby the pedestals can be rigidly but removeably secured to bench 22 by bolts 54 for positioning bench 22 at a desired height. FIGS. 12 and 13 more clearly illustrates the securement of a pedestal to the bench by means of threaded bolt 54; FIG. 12 showing the assembly of the pedestals to the bench at the lowermost position of the seat and FIG. 13 illustrating the position of the bench relative to the uppermost position a pedestal during assembly.

FIGS. 2, 3, 5, 7 and 8 illustrate fairing 60 formed integrally with side walls 42 and seat portion 33 to provide a tapered leg support for a child. Fairing 60 has lateral shoulders 62 triangular in shape adapted to abut the front edges 64 of pedestals 20, 21. As the raising and lowering of bench 22 narrows and widens the spacing between the pedestals, as depicted most clearly in FIG. 11, the shoulders 62 accommodate the changes in lateral spacing of the pedestals.

The bottom side edges 66 of bench 22 are rearwardly inclined at substantially the same angle as the rearward inclination of the bottom edges 23 of the side pedestals, preferably at an angle of about 7°–15°, relative to the plane of the bench seat 33, whereby positioning of the child's seat 10 on a vehicle seat 12, regardless of the height of bench 22, permits child's seat 10 to closely abut the vehicle seat and assume an angle of at least 10° to the horizontal.

The present invention provides a number of important advantages. The child's seat is adjustable to accommodate children of different sizes or a single growing child. The seat remains safe and comfortable in each configuration for use with a vehicle seat belt. The bench can be reversed to provide a level seat, as shown in FIG. 3, when desired for use as a baby seat.

It will be understood that modifications can be made in the embodiment of the invention illustrated and described herein without departing from the scope and purview of the invention as defined by the appended claims.

What I claim as new and desire to protect by Letters Patent of the United States is:

1. An adjustable child's seat for use in association with a base on which the seat may be placed, such as the seating means of a vehicle having seat belts affixed to the vehicle, or a table, wherein said child's seat comprises:
   a bench;
   side pedestals on each of two opposite sides of the bench;
   releasable support means supporting the bench on each pedestal at any of a plurality of vertically spaced-apart positions; and
   spacer means laterally spacing the pedestals at any one of a plurality of predetermined distances apart, said releasable support means and spacer means so constructed to narrow the lateral spacing of the pedestals when said bench is supported therebetween at upper positions and to widen the lateral spacing of the pedestals when said bench is supported therebetween at lower positions; and fastening means for fastening said pedestals to the bench.

2. An adjustable child's seat as claimed in claim 1, wherein each side pedestal defines a plurality of generally vertically spaced-apart bench receiving support means to provide said releasable support means, each said bench receiving support means being adapted to receive one side of the bench.

3. An adjustable child's seat as claimed in claim 2, wherein each side pedestal has belt-receiving means for receiving a vehicle seat belt for affixing the child's seat to the vehicle seating means.

4. An adjustable child's seat as claimed in claim 2, wherein each bench receiving support means comprises a first recess means.

5. An adjustable child's seat as claimed in claim 4, wherein said spacer means comprises the provision of said first recess means having different depths.

6. An adjustable child's seat as claimed in claim 5, wherein said depths decrease from a maximum depth at an uppermost first recess means to a minimum depth at a lowermost first recess means.

7. An adjustable child's seat as claimed in claim 6, wherein said fastening means comprises bolt means adapted to pass through the pedestals for releasably attaching the said side pedestals to the bench.

8. An adjustable child's seat as claimed in claim 1, which additionally comprises second support means below said releasable support means.

9. An adjustable child's seat as claimed in claim 8, wherein said pedestals define a plurality of generally vertically spaced-apart lower support receiving means to provide said second support means, each said lower support receiving means adapted to receive an extension of one side of the bench.

10. An adjustable child's seat as claimed in claim 9, wherein each lower support receiving means comprises a second recess means.

11. An adjustable child's seat as claimed in claim 10, wherein said second recess means have depths decreasing from a maximum depth at an uppermost second recess means to a minimum depth at a lowermost second recess means, in increments substantially equal to the depths between corresponding first recess means, and said second recess means are equally vertically spaced from first recess means of a corresponding depth.

12. An adjustable child's seat as claimed in claim 11 in which said fastening means comprise at least one stud projecting from each side of the bench, a plurality of generally vertically spaced-apart sockets formed in the pedestals having a vertical spacing corresponding the vertical spacing of the first recess means for receiving said stud, and a bolt for securing said stud in a socket.

13. An adjustable child's seat as claimed in claim 12 in which said stud-receiving sockets have depths decreasing from a maximum depth at an uppermost socket to a minimum depth at a lowermost socket.

14. An adjustable child's seat as claimed in claim 13 in which said fastening means comprise a pair of generally laterally spaced-apart studs projecting from each side of the bench and a pair of laterally spaced-apart mating sockets vertically spaced corresponding to the vertical spacing of the first recess means.

15. An adjustable child's seat as claimed in claim 11 in which said bench has an upper elongated lateral projection formed on each side adapted to be received in said first recess means and a lower elongated projection adapted to be received in a corresponding lower second recess means, whereby lowering said bench on said side pedestals widens the lateral spacing of the side pedestals to accommodate a larger child.

16. An adjustable child's seat as claimed in claim 15 in which said side pedestals have belt-receiving means for receiving a vehicle seat belt for affixing the seat to the vehicle seating means.

17. An adjustable child's seat as claimed in claim 16 in which said belt-receiving means comprise rearwardly extending slots formed in front edges of the pedestals.

18. An adjustable child's seat as claimed in claim 17 in which the bottom edge of the pedestals are rearwardly upwardly inclined at an angle from the front edges of the pedestals of about 7°–15° to the plane of the bench seat, whereby the child's seat is rearwardly inclined downwardly at least 10° to the horizontal on vehicle seating means.

19. An adjustable child's seat as claimed in claim 15 in which said pedestals and bench are constructed of molded thermoplastic or thermosetting plastic.

20. An adjustable child's seat as claimed in claim 19 in which said pedestals and bench are hollow, said pedestals having closure means pivotally mounted on outer faces thereof for access to the fastening means.

21. An adjustable child's seat as claimed in claim 19 in which said bench has an upper seat surface inclined at an angle of about 7°–15° to the lower edges of the pedestals and has a fairing forming an extension of the front end thereof, whereby the fairing forms leg support means at the forward end of the seat or seat levelling means when the seat is reversed in the side pedestals.

22. An adjustable child's seat as claimed in claim 19 wherein the external side of each said side pedestal defines a recessed portion and wherein a side panel may be affixed within said recesses flush with said external side.

23. An adjustable child's seat as claimed in claim 19 wherein said pedestals define arm rests.

* * * * *